United States Patent
Ohnami

(10) Patent No.: US 7,245,664 B1
(45) Date of Patent: Jul. 17, 2007

(54) TRANSMISSION CONTROL METHOD OF CODED VIDEO SIGNALS AND TRANSMISSION SYSTEM

(75) Inventor: Yuichi Ohnami, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 09/572,427

(22) Filed: May 17, 2000

(30) Foreign Application Priority Data

May 20, 1999 (JP) .................................. 11-139551

(51) Int. Cl.
*H04N 7/12* (2006.01)
(52) U.S. Cl. ............ 375/240.28; 375/240; 375/240.01; 375/240.26
(58) Field of Classification Search ............. 348/14.11, 348/14.13, 211.5, 705, 143; 375/240.01, 375/240.12–240.16, 240.26–240.28, 240; 386/66, 81, 116; 370/510; 725/105; *H04N 7/12*
See application file for complete search history.

(56) References Cited

U.S. PATENT DOCUMENTS

| | | | | |
|---|---|---|---|---|
| 3,770,897 A | * | 11/1973 | Haussmann et al. | 370/510 |
| 5,162,903 A | * | 11/1992 | Ogino et al. | 348/705 |
| 5,206,859 A | * | 4/1993 | Anzai | 348/14.11 |
| 5,440,591 A | * | 8/1995 | Liron et al. | 375/354 |
| 5,778,139 A | * | 7/1998 | Kim | 386/116 |
| 5,881,070 A | * | 3/1999 | Hoshi | 375/253 |
| 5,978,651 A | * | 11/1999 | Eto et al. | 348/14.13 |
| 6,028,726 A | * | 2/2000 | Yanagihara | 386/81 |
| 2003/0101461 A1 | * | 5/2003 | Todogawa et al. | 725/105 |

FOREIGN PATENT DOCUMENTS

JP 6245204 9/1994

* cited by examiner

*Primary Examiner*—Allen Wong
(74) *Attorney, Agent, or Firm*—Mattingly, Stanger, Malur & Brundidge, P.C.

(57) ABSTRACT

A system for transmitting coded digital video signals in a packet form through a signal line and a method of controlling the system. A transmission portion converts the digital video signals to a signal stream as a sequence of a plurality of packets each containing a predetermined sync code and a payload, and transmitting the signal stream. In case a fail of periodicity of the video signals is detected, a signal stream containing a packet into which a predetermined dummy signal not being the sync code is inserted into a position of sync code in a packet to be transmitted at that time and is transmitted. When receiving no sync code at a predetermined portion in the received packet, a reception portion executes an image reproduction process on the basis of the video signal data not depending on the packet containing the dummy signal and is so received.

14 Claims, 12 Drawing Sheets

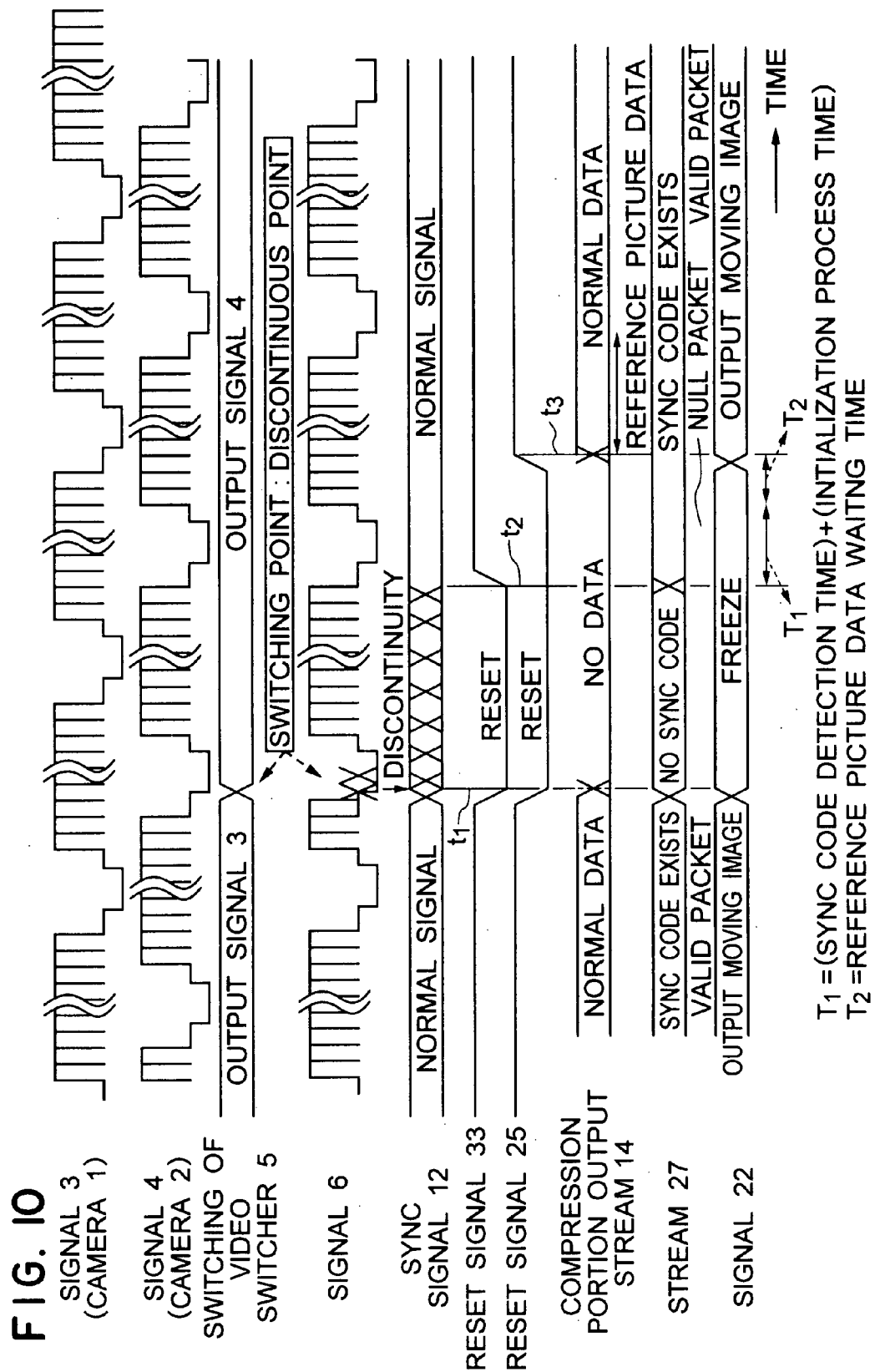

TRANSMISSION CONTROL METHOD OF CODED VIDEO SIGNALS AND TRANSMISSION SYSTEM

BACKGROUND OF THE INVENTION

This invention relates to a system for transmitting video signals and its control method. When coded digital video signals are transmitted, this system ensures images devoid of image distortion on the reception side even when consecutiveness of the signals is lost.

MPEG2 compression system of the global standard has gained a wide application at present for compressing and transmitting video signals.

The MPEG2 compression system or an equivalent system is based on the premise that input video signals that are compressed are consecutive signals keeping periodicity.

For, compressed image data of one frame are generated in the compression process by using data of a plurality of frames having mutually different time. Unless these frames keep mutual periodicity (both vertical and horizontal periodicities), normal compressed data cannot be acquired.

FIG. 2 of the accompanying drawings shows schematically the outline of input analog video signals. As shown in the drawing, the video signal keeps a predetermined condition as to the relationship between the horizontal sync signal and the vertical sync signal of the video signals in accordance with the standard of the video signals.

The inventor of the present invention has found out that the problem yet to be solved is left when the video signals obtained by outputs of a plurality of surveillance cameras are alternately switched and selected by a switch and the selected video signals from one of the cameras are transmitted after compression and coding to a remote monitor room through a communication line. The video signals from the plurality of surveillance cameras do not always keep a coincident phase and their synchronization is not ensured. Therefore, if a plurality of different video signals are switched and one of the video signals is selectively outputted at the timing that is irrelevant to the vertical and horizontal sync signals of the respective video signals, the vertical sync signal or the horizontal sync signal between different video signals so outputted does not keep predetermined periodicity. Consequently, periodicity of the video signals is distorted.

Consecutiveness of the input video signals is not always ensured when the video signals coded by the MPEG2 compression system are utilized in the surveillance camera system, as will be explained next.

FIG. 3 shows a schematic construction of a multi-camera surveillance system that the inventor of the present invention has examined. Reference numerals 1 and 2 denote video cameras for taking the images under observation. Though ten or more video cameras are employed depending on a system, the example shown in FIG. 3 uses two video cameras.

The output signals 3 and 4 of these cameras are inputted to a video switcher 5 and are switched. One of the outputs is periodically and automatically outputted. The selected signals are inputted as video signals 6 to a transmitter 7. The video signal 6 is converted to a digital composite signal 9 by an A/D converter 8 in the transmitter 7.

The composite signal 9 is inputted to a component conversion portion 10, and is outputted as the video signal that is separated into a luminance component signal and a chromatic component signal, and its sync signal 12. Here, the term "sync signal" represents HR (a signal representing a horizontal effective pixel range), VR (a signal presenting a vertical effective line), ODD (a signal representing a first field), and so forth.

These signals are inputted to a compression portion 13 such as an MPEG2 encoder. The video signal 11 of an effective signal area is compressed on the basis of the sync signal 12 to give a stream 14 as compressed data, that is then transmitted.

This stream 14 is inputted to a receiver 15. After inputted to the receiver 15, the stream 14 is then inputted to a decoder 16. The decoder 16 decodes the stream and outputs a video signal 17 and a sync signal 18.

The video signal 17 and the sync signal 18 are inputted to a composite conversion portion 19 and are outputted as a composite signal 20. The composite signal 20 is converted to an analog video signal 22 by a D/A converter 21. The video signal 22 is inputted to a video monitor 23.

In this way, the image based on the output signals 3 and 4 of the video cameras 1 and 2 switched by the video switcher 5 can be monitored on a video monitor 23.

In such a monitor system, the output signals 3 and 4 of the cameras 1 and 2 are generally asynchronous with each other in most cases.

For this reason, the signal 6 switched by the video switcher 5 becomes an discontinuous signal, that is, a signal having distorted periodicity, at the point of switching.

However, the compressed input video signal in the MPEG2 compression system is based on the premise that the signal keeps periodicity, as described above. Therefore, when the discontinuous signal is inputted to the component conversion portion 10, violation occurs in its internal processing portion with the result that the video signal and the sync signal 12 lose periodicity, too.

A time of dozens of milliseconds is necessary before the component conversion portion 10, to which the discontinuous signal 6 is inputted, recovers to be normal operation and outputs a regular sync signal 12.

On the other hand, the operation of the compression portion 13, to which the discontinuous video signal and the sync signal 12 are inputted, gets distorted, too, and generates error data in the resulting stream 14.

Therefore, the decoder 16 of the receiver 15 generates the noise due to the compression-coded data error, and the image collapses or gets distorted on the video monitor 23.

FIG. 4 shows schematically the mode of this trouble. The drawing shows the case where the signals 3 and 4 are inputted asynchronously with their phases dephasing from each other, and the output of the video switcher 5 is changed over from the signal 3 to the signal 4 at a certain point of time.

In the video signal 6 so switched and selected, a discontinuous portion develops at the switching point of the signal as shown in FIG. 4.

This discontinuous point triggers and invites distortion of periodicity in the sync signal 12 as the output of the component conversion portion 10 for a period of dozens of milliseconds. The consecutive video signal 11 based on the signal 4 and the sync signal 12 are thereafter outputted.

As a result, collapse and distortion of the image occur eventually in the video monitor 23.

To solve this problem, it has been necessary to use a video switcher having a frame synchronization function for the video switcher 5.

This frame synchronization function can synchronize a plurality of asynchronous input signals by signal processing and can output one of them selectively. When this synchronization switcher is used, the occurrence of the collapse and distortion of the image can be prevented. The synchronization function once writes a plurality of input video signals into frame memories and reads any one of them out from the frame memories by a common read signal.

However, because the video switcher equipped with the frame synchronization function is very expensive, the increase of the cost becomes a serious problem particularly in a surveillance system that handle the signals of a large number of cameras.

SUMMARY OF THE INVENTION

To solve the problems described above, the present invention provides a practical transmission apparatus that eliminates the necessity for a video switcher equipped with an expensive frame synchronization function by detecting a discontinuous point inside a transmitter, transmitting appropriately the detection result to a receiver, and executing an appropriate processing of an output image on the receiver side before image distortion resulting from the discontinuous point develops. The appropriate processing of the output image may be, for example, a freezing the output image to the latest image, replacing the current image with another normal image, and so on.

The operation in the system according to the present invention for transmitting coded digital video signals in a packet form through a communication line is as follows. A transmission portion converts the digital video signal to a signal stream as a sequence of packets each containing a predetermined sync code and a payload, and transmits the signal stream. The transmission portion transmits a signal stream containing a packet, into which a predetermined dummy signal that is not the sync code is inserted in place of the true sync code, when a fail of periodicity in the video signal is detected. When the true sync code is not detected at a regular position in the packet, a reception portion executes an image reproduction process on the basis of the other video signal data not depending on the received such packet.

According to one aspect of the present invention, a switcher selectively switches any one of a plurality of video signals, the phases of which are mutually asynchronous, from a plurality of video cameras and outputs the selected video signal to the transmission portion.

According to another aspect of the present invention, when a sync code is not detected at the regular position in the packet received, the reception portion outputs the video signal that is obtained by decoding the stream of the normal packets at the time of the detection of the sync code. For instance, the reception portion executes a freeze process that keeps as such the normal image output immediately before the point at which detection of the sync code becomes impossible.

According to still another aspect of the present invention, the reception portion outputs a video signal of a predetermined image when it cannot detect the sync code at a regular position in the packets it receives. For instance, the reception portion outputs the normal video signals of the image that is stored in advance in a memory.

According to still another aspect of the present invention, the data compression process described above is reset when the transmission portion detects the loss of periodicity of the video signals.

According to still another aspect of the present invention, when the reception portion cannot detect periodicity of the sync code from the signal stream it receives, the reception portion executes a process including resetting of a decoding process of the signal stream it receives.

According to still another aspect of the present invention, the transmission portion re-starts inserting the sync code into the regular position in the packet when periodicity of the video signal to be compressed is recovered, and arbitrarily sets a standby time till the release of resetting of the data compression process.

According to still another aspect of the present invention, the transmission portion re-starts inserting the sync code into the regular position in the packet when periodicity of the video signal to be compressed is recovered. The transmission portion sets the standby time from the re-start of insertion of the sync code to the release of resetting of the data compression process depending on the sum of the time necessary for detecting a predetermined number of times the existence of the sync data at a regular position in the null packet on the reception side, the time necessary for initialization of a decoding process on the reception side and the time necessary for indexing the start of a reference picture of compressed data.

BRIEF DESCRIPTION OF THE DRAWINGS

FIG. 10 is an explanatory signal diagram useful for explaining the operation of the transmission system shown in FIG. 9;

DESCRIPTION OF THE EMBODIMENTS

Figure 3:
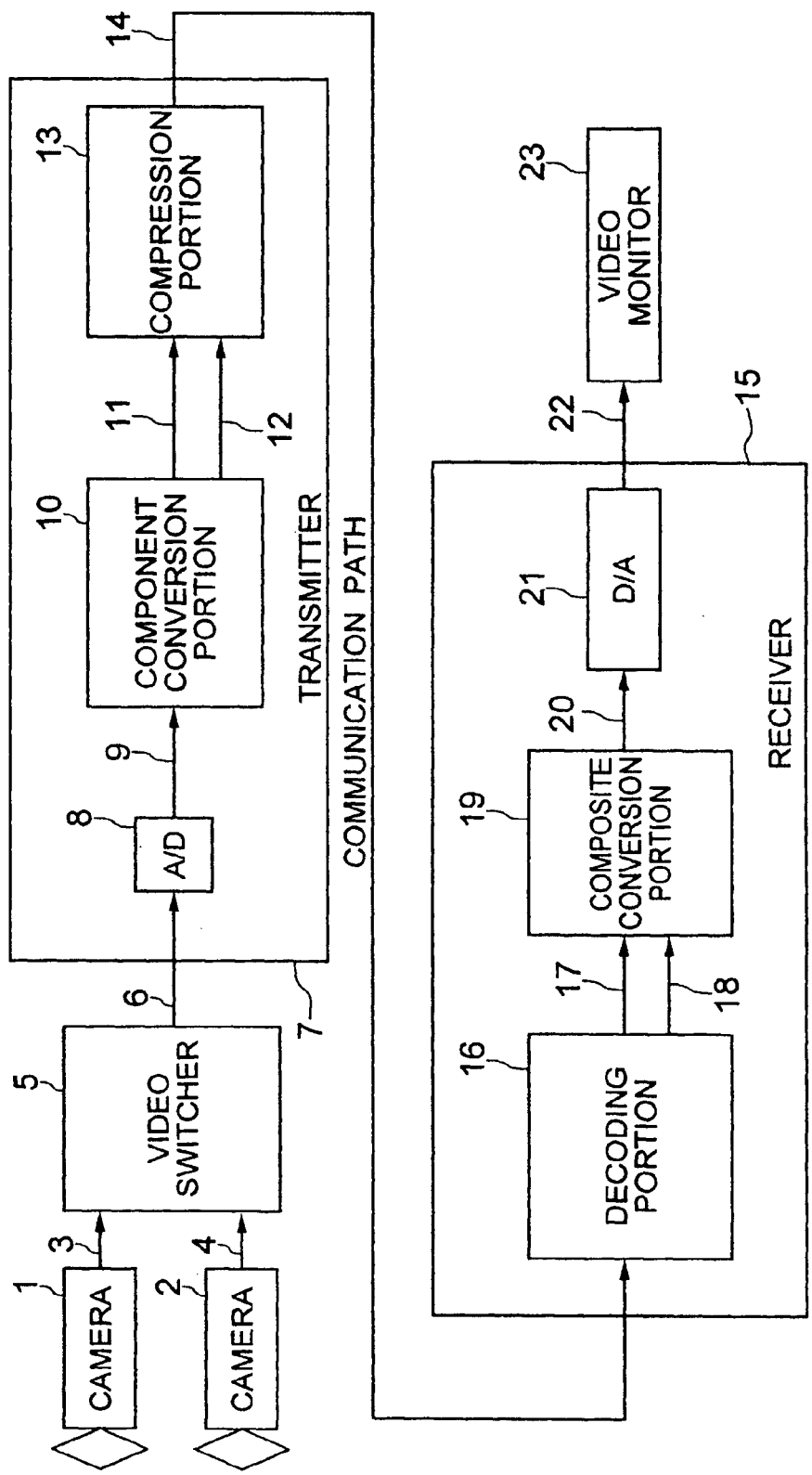
FIG. 3 is a block diagram showing the overall construction of an example of a monitor system.
Figure 4:
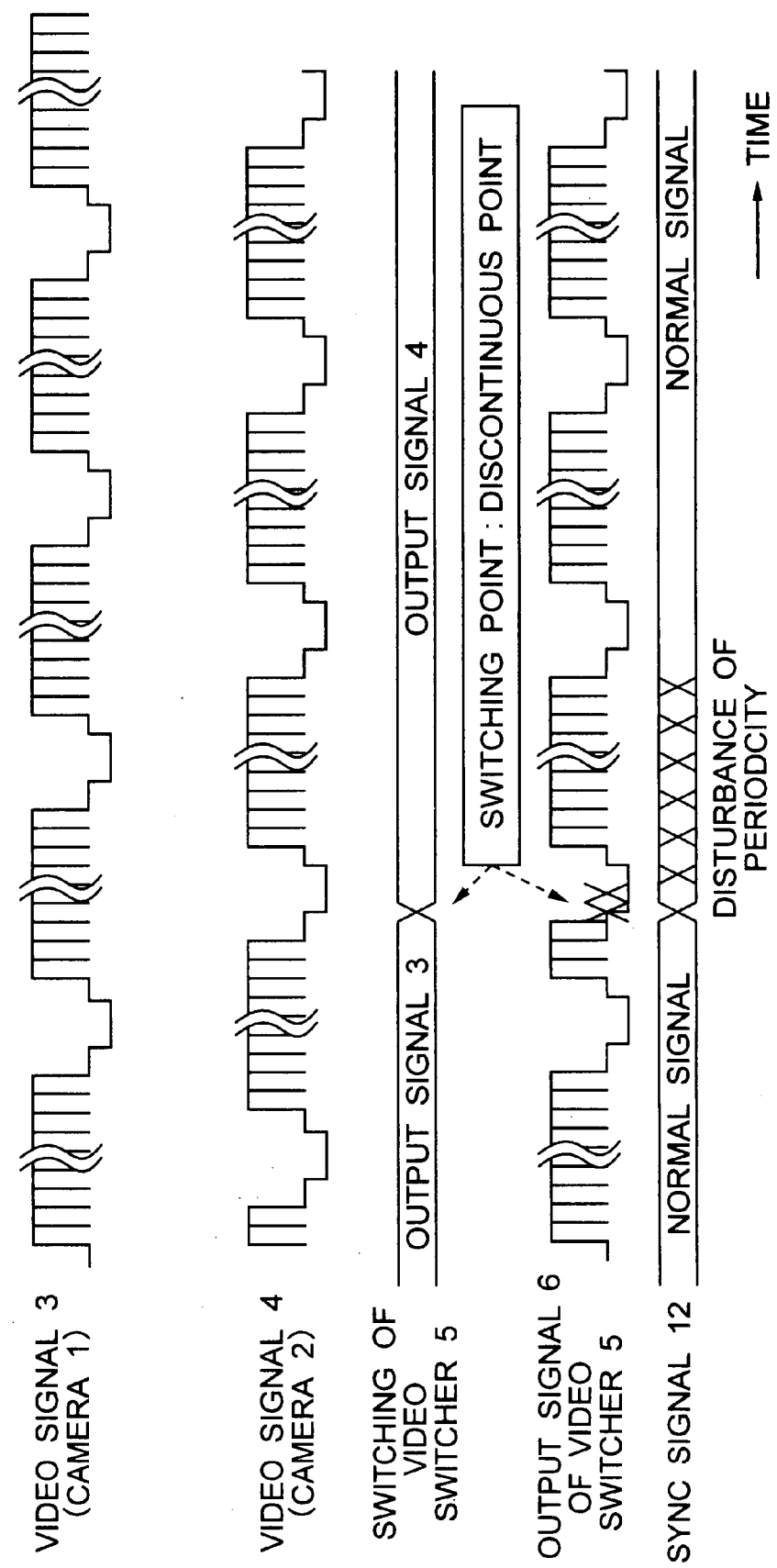
FIG. 4 is an explanatory view useful for explaining a discontinuous state generated by switching of video signals.

Hereinafter, the construction of the transmitter according to the first embodiment of the present invention will be explained in detail with reference to FIG. 1. In this drawing, like reference numerals will be used to identify like constituent members as in FIG. 3. Reference numerals 1 and 2 denote video cameras for monitoring a monitor object. The embodiment shown in FIG. 1 uses two video cameras, though ten or more video cameras can be used depending on the system configuration.

The output signals 3 and 4 of these video cameras are inputted to a video switcher 5 and are automatically switched in a predetermined cycle (e.g. several seconds). The selected signals are inputted as the video signals 6 to a transmitter 7.

In this transmitter 7, the video signal 6 is inputted to an A/D converter 8 and is converted to a digital composite signal 9.

The digital composite signal 9 is inputted to a component conversion portion 10 and is outputted as a video signal 11, that is separated into a luminance component signal and a chromatic component signal, with its sync signal 12. This sync signal is HR (a signal representing a horizontal effective pixel range), VR (a signal representing a vertical effective line), ODD (a signal representing the first field), and so forth.

These signals are inputted to a compression portion 13 having an MPEG2 encoder. The video signal 11 of the effective area is compressed and converted to a stream 14 having a packet structure as compressed data on the basis of the sync signal 12. The stream 14 is inputted to a packeting portion 26.

On the other hand, the sync signal 12 is inputted to a discontinuity detection portion 24, too. When the discontinuity detection portion 24 detects a discontinuous point of the sync signal 12, a reset signal 25 is supplied to the packeting portion 26.

A stream 27 as the output of the packeting portion 26 is transmitted to the receiver 15 and is inputted to a packet analysis portion 29 of this receiver 15.

The packet analysis portion 29 supplies the stream 28 and a sync code non-detection signal 30 to the decoder portion 16.

The component video signal 17 (luminance component+ chromatic component) decoded by the decoder portion 16 and the sync signal 18 are outputted to a composite conversion portion 19.

The composite conversion portion 19 converts the component video signal and the sync signal to a composite signal 20 and outputs the composite signal 20 to a D/A converter 21. The D/A converter 21 converts the digital composite video signal 20 to an analog video signal 22 and outputs it to a video monitor 23.

Next, the operation of the transmission system shown in FIG. 1 will be explained in further detail.

The process in which the output signals 3 and 4 of the video cameras 1 and 2 are processed by the video switcher 5, the A/D converter 8, the component conversion portion 10 and the compression portion 13 is the same as the process of the conventional system. Therefore, the explanation will be omitted.

Figure 1:
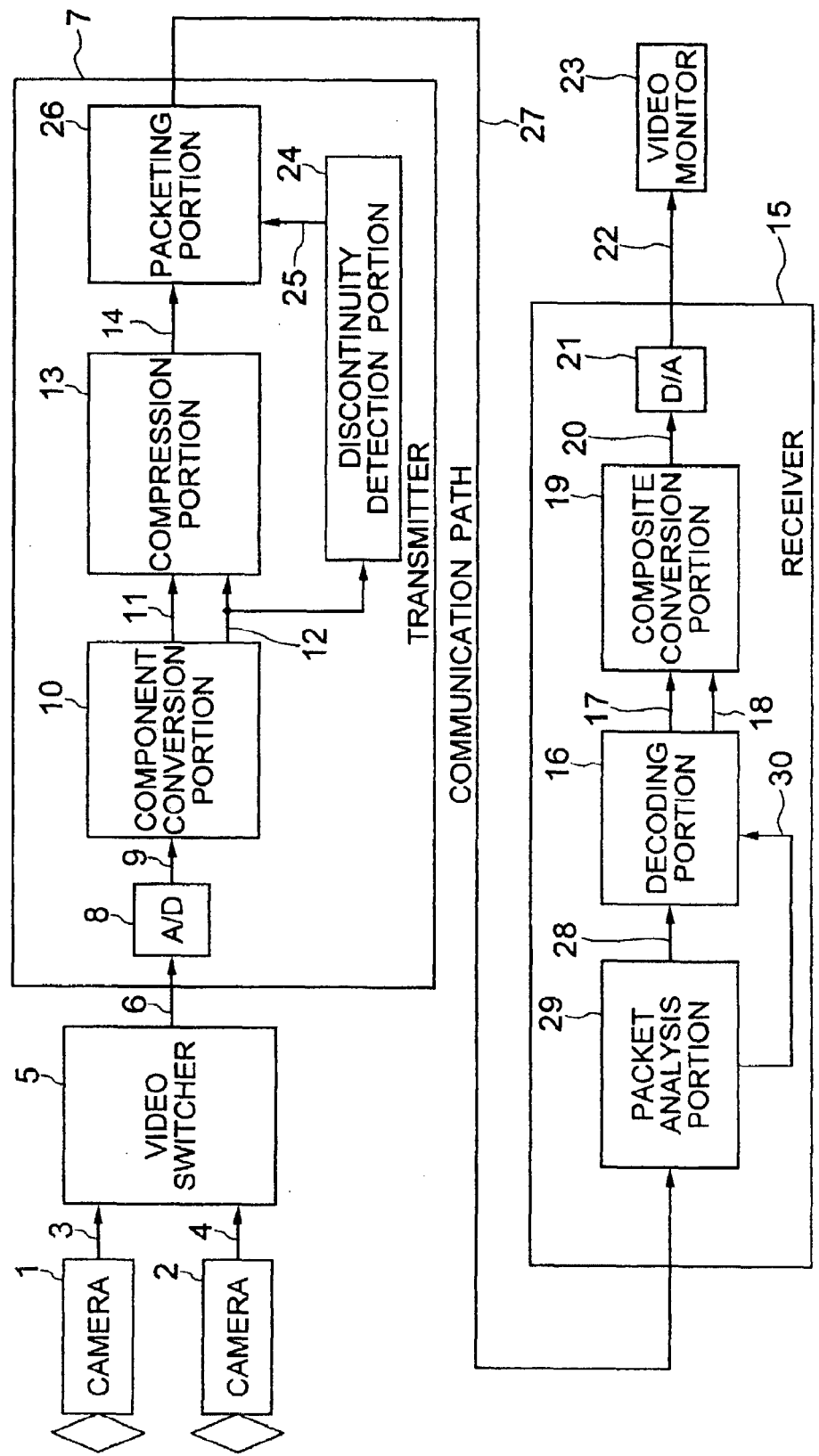
FIG. 1 is a block diagram showing the overall construction of a transmission apparatus of video signals according to the first embodiment of the present invention.
Figure 2:
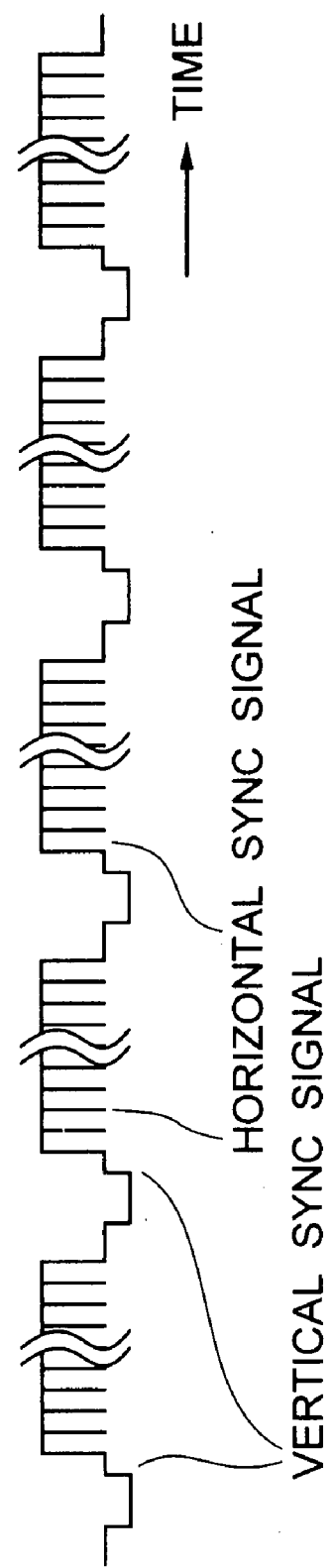
FIG. 2 is a schematic view showing the waveforms of consecutive video signals.

In the embodiment of the present invention shown in FIG. 1, the stream 14 is packeted by the packeting portion 26 to the transmission stream 27, which is then delivered to the receiver 15.

Figure 5:
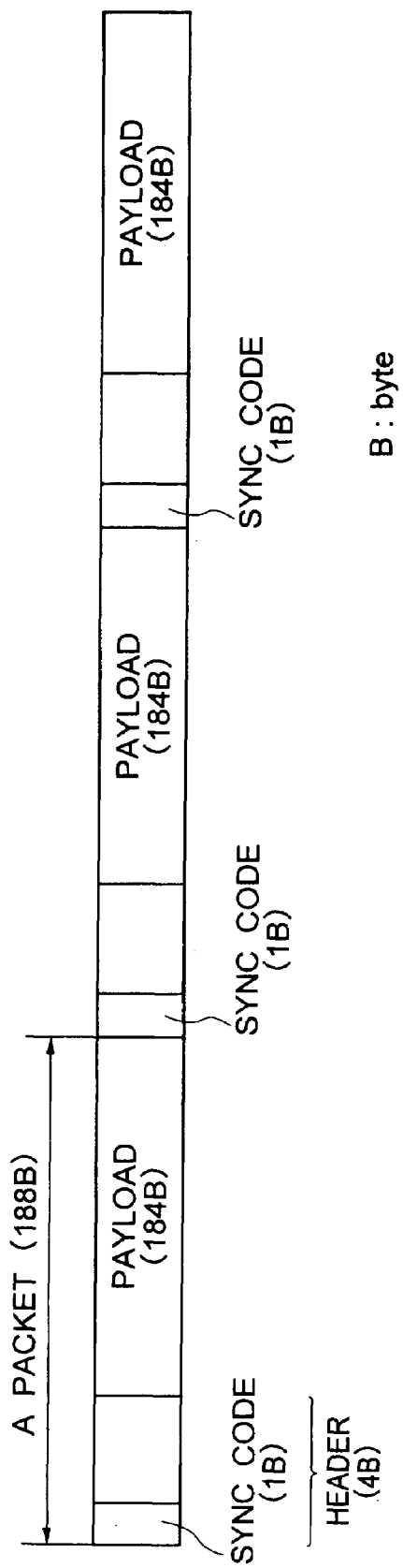
FIG. 5 is a schematic view showing an example of the format of a transmission stream in a packet form.

FIG. 5 shows schematically an example of this transmission stream 27. In this example, one packet comprises 188 B (byte), and a sync code of a fixed value (e.g. "47 h" in hexadecimal notation) is added to the leading byte.

In FIG. 5, each header has 4 bytes including one-byte sync code, each payload has 184 B (byte), and the stream 14 of the compressed data comprising 184 B is put into this payload portion.

On the other hand, the packet analysis portion 29 of the receiver 5 extracts only the data of the payload portion from each packet of the stream 27 so transmitted, and outputs it as a stream 28.

The decoder portion 16 decodes this stream 28 and outputs the video signal 17 and the sync signal 18 to the composite conversion portion 19.

The composite signal 20 subjected to composite conversion in the composite conversion portion 19 is inputted to the D/A converter 21 and is outputted as the analog video signal. In consequence, the image is displayed on the video monitor 23.

The discontinuous point develops hereby in the signal 6 due to switching of the output signals by the video switcher 5 with the result that the discontinuous state (disturbance of synchronization) occurs in the sync signal 12. In the system shown in FIG. 1, the discontinuity detection portion 24 counts the cycle of the sync signal 12. When the count value deviates from a predetermined reference value, the discontinuity detection portion 24 judges that the sync signal 12 involves disturbance of synchronization, and indirectly detects the occurrence of discontinuity of the signal (lack of periodicity).

Figure 11A:
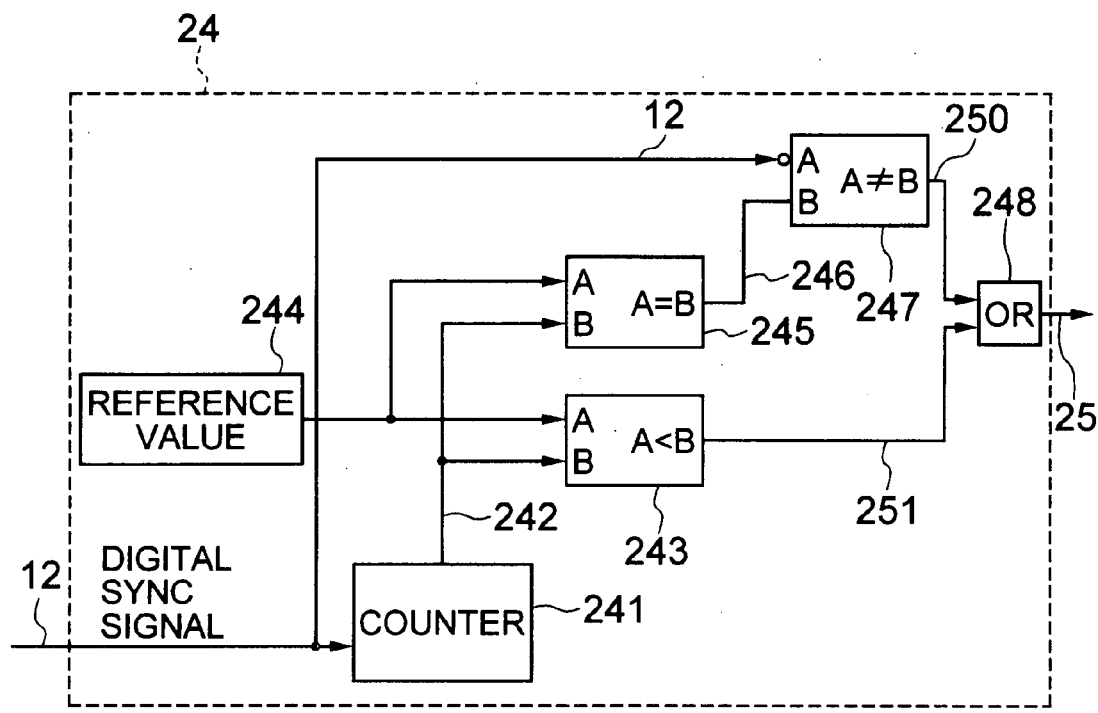
FIGS. 11A and 11B are a block diagram and a waveform diagram showing a concrete structural example of a discontinuity detection portion.
Figure 11B:
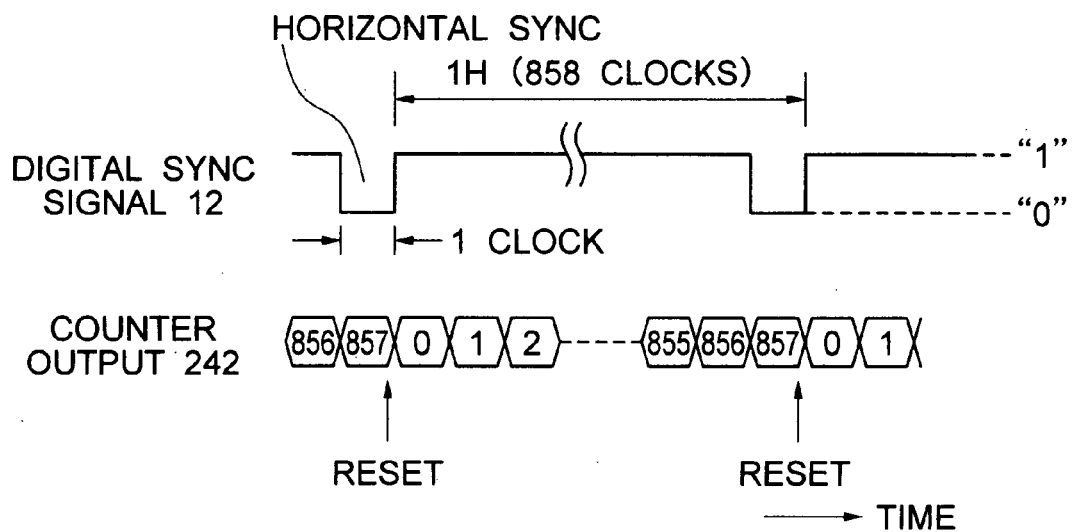

The construction of the discontinuity detection portion 24 and its discontinuity detection method will be explained concretely with reference to FIGS. 11A and 11B.

The counter output 242 of a counter 241 is reset when the value of a sync pulse portion of the digital sync signal 12 (e.g. "0" in FIG. 11B), that is isolated and extracted from the video signal, is inputted. The counter 241 counts up the counter output 242 when the value of portions other than the sync pulse (e.g. "1" in FIG. 11B) is inputted.

Therefore, when periodicity of the sync signal is secured, the digital sync signal 12 inevitably takes the position of the sync pulse whenever the counter output 242 reaches the value representing periodicity of the sync signal (e.g. 857 clocks in the case of the horizontal sync cycle). The counter output 242 is reset in the cycle of the sync signal. Subsequently, the counter 241 repeats the operation as long as continuity is secured.

On the other hand, the counter output 242 is not counted up beyond a reference value 244 that represents the correct cycle of the sync signal. Therefore, a comparator 243 remains OFF ("0").

Because the value (857) of the counter output 242 becomes equal to the reference cycle value 244 (857) at the sync pulse position, a comparator 245 is turned ON ("1").

As long as continuity is secured, the output 246 of the comparator 245 is always coincident with the digital sync signal 12, and the output of a comparator 247 remains OFF ("0"). Therefore, the output signal 25 of a logical OR 248 is always OFF ("0") and the signal representing discontinuity is never turned ON.

Next, when discontinuity develops and the sync signal occurs in the digital sync signal 12 in a cycle shorter than the original cycle (reference value 244), the output 246 of the comparator 245 is turned OFF ("0") and does not coincide with the digital sync signal 12. Consequently, the output 250 of a comparator 248 is turned ON ("1"). In consequence, the signal 25 is turned ON, too, and represents discontinuity.

When the sync pulse occurs in the digital sync signal 12 in a cycle longer than the original cycle, on the contrary, the counter output 242 is counted up to a value greater than the sync cycle value 244. Therefore, the output 251 of the comparator 243 is turned ON ("1"), and the signal 25 is turned ON, too, and represents discontinuity.

In other words, the signal 25 is turned ON (detection of discontinuity) in at least one of the cases where the cycle of the digital sync signal 12 is shorter and longer than the reference value 244.

Incidentally, the construction and the operation for detecting discontinuity of the vertical sync signal are basically the same as the construction and the operation for detecting discontinuity of the horizontal sync signal described above. In this case, the counter 241 exhibits its reset and count-up operations in one line unit, and the reference value 244 takes the value of the normal vertical sync period.

Figure 12A:
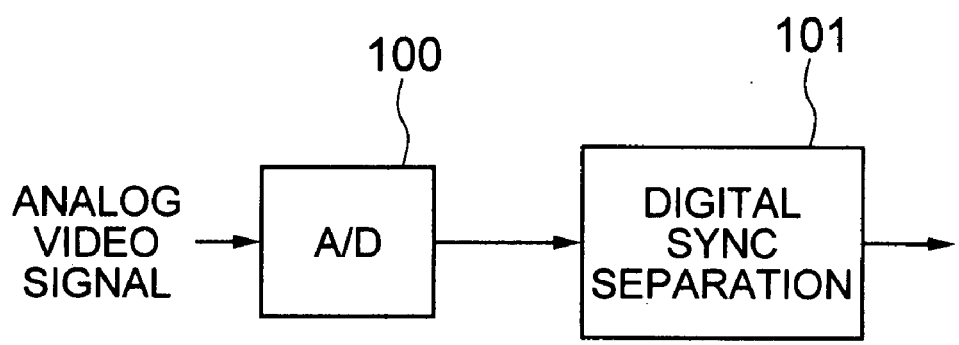
FIGS. 12A and 12B are block circuit diagrams for acquiring a digital sync signal for detecting discontinuity.
Figure 12B:
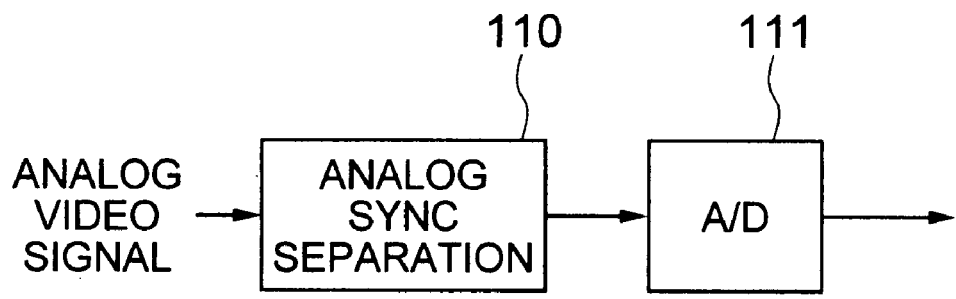

The output of the component conversion portion 10 need not always be used as the digital sync signal for detecting discontinuity. FIGS. 12A and 12B show another example of sync signal detection. In FIG. 12A, the analog video signal subsequent to the video switcher 5 is converted to a digital video signal by an A/D converter 100. A digital sync separation circuit 101 acquires a digital sync signal 12. In FIG. 12B, an analog sync separation circuit 110 separates the analog sync signal from the analog video signal and the A/D converter 111 converts the analog sync signal to the digital sync signal 12.

When discontinuity of the sync signals 12 is detected, the packeting portion 26 is immediately reset by the reset signal 25 from the discontinuity detection portion 24. In response to the reset signal 25, the packeting portion 26 stops adding the predetermined sync code, that is normally added to the leading part of each packet of the stream 27, and adds the non-sync code (dummy signal) instead.

Here, it takes a certain time for the compression portion 13 to output the output of the compression processing. For this reason, the error data due to the discontinuous input does not exist in the stream 14 that is outputted from the compression portion 13 at the point of time when the discontinuity detection portion 24 resets the packeting portion 26.

In other words, if the generation of the sync code is stopped at the detection point of the discontinuous state, the sync code having the fixed value is not added to the packet that is somewhat ahead of the occurrence of the error data.

The transmission stream 27 delivered from the packeting portion 26 containing the packet, in which the error data due to the discontinuous input exists, becomes a stream to which the predetermined sync code is not added. However, since the dummy signal is added in one byte in place of the sync code, the reception side can receive this stream as a correct stream format.

Receiving such a transmission stream 27, the packet analysis portion 29 of the receiver 15 on the reception side detects the packet not having the predetermined sync code from among the streams 27 inputted thereto, and outputs the sync code non-detection signal 30 to the decoder portion 16.

The decoder portion 16 freezes as such the output the signal of the monitor image at that point, in response to the sync code non-detection signal 30. The image thus frozen is outputted to the video monitor 23 through the composite conversion portion 19 and the D/A converter 21.

The normal transmission stream 27 that is received before the detection of discontinuity does not contain the error data. Therefore, the image frozen hereby can be frozen under the normal image condition.

After the lapse of a certain time from switching of the video switcher 5, the sync signals 12 get stabilized in the normal cycle. Then, the reset signal 25 from the discontinuity detection portion 24 is released. The packeting portion 26 again adds the predetermined sync code, packets the stream 14 and outputs it as the transmission stream 27. Strictly speaking, the time from stabilization of the sync signal 12 to the normal cycle to the release of resetting of the packeting portion 26 is set to a longer time than the processing time of the compression processing portion 13.

In other words, the predetermined correct sync code is added to the transmission stream 27 after the stream 14 changes to the stream having the completely normal data.

In consequence, the packet analysis portion 29 of the reception portion 15 detects again the predetermined sync code at the head of packet, and the sync code non-detection signal 30 becomes inactive. The decoder portion 16 releases the freezing operation and the process turns to the normal decoding process, so that the normal video signals are outputted to the video monitor 23.

Incidentally, the function of the discontinuity detection portion 24 may be incorporated into the component conversion portion 10.

Figure 6:
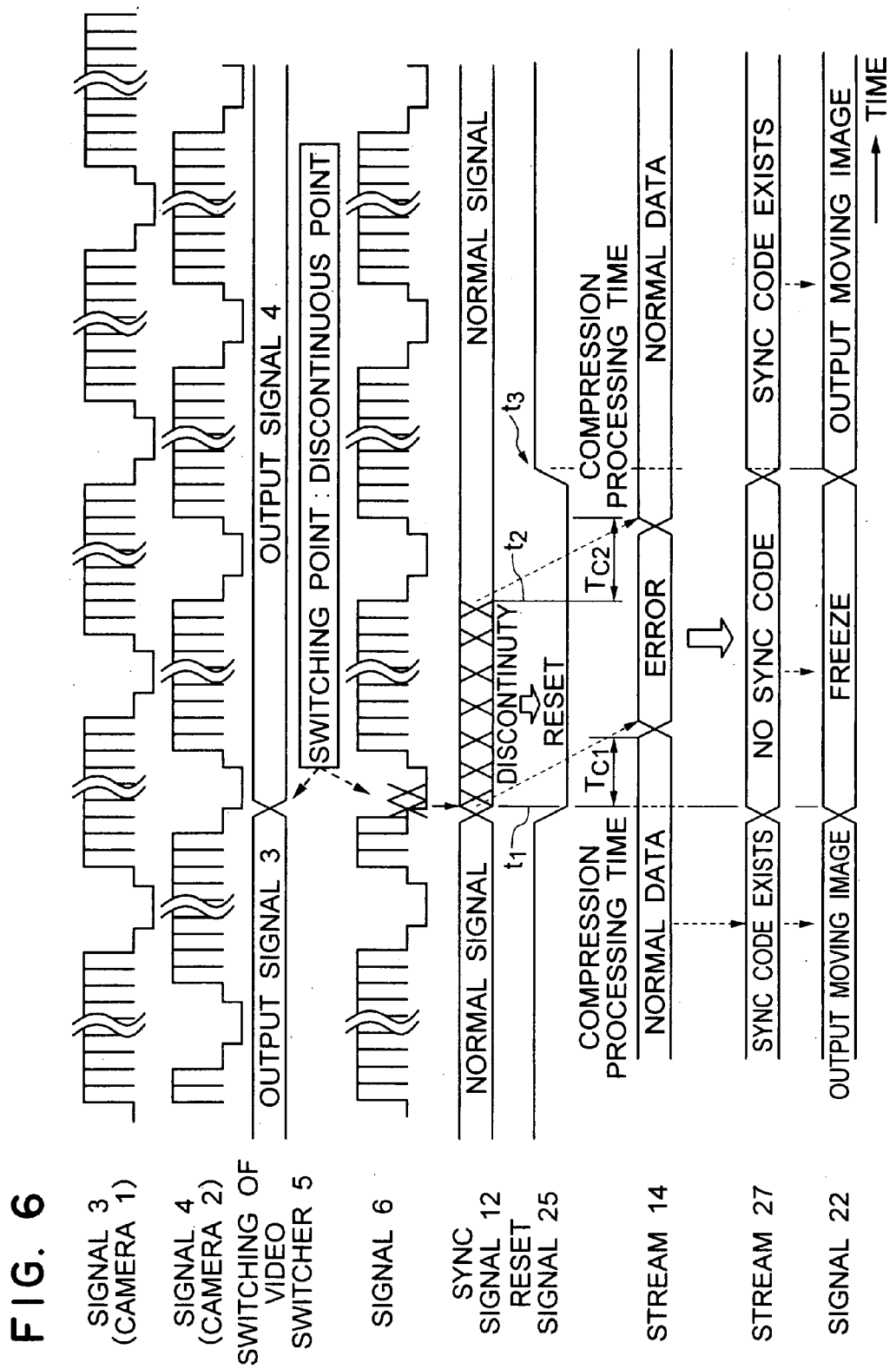
FIG. 6 is an explanatory signal diagram useful for explaining the operation of a transmission system.

The flow of the signals described above will be explained with reference to the signal diagram of FIG. 6. Since the signals 3 and 4 are asynchronous, their phases deviate from each other.

When the video switcher 5 switches the signal 3 to the signal 4 at the time t1, the discontinuous portion, that is, the portion at which synchronization of the signal is lost (represented by X in the diagram), develops in the signal 6 selected at the switching point. In consequence, a discontinuous signal (having disturbance of the cycle) occurs in the sync signal 12 for dozens of milliseconds.

Detecting the discontinuous state of the sync signal 12, the discontinuity detection portion 24 outputs the reset signal, that falls to the "LOW" level during the discontinuous period, to the packeting portion 26.

Consequently, the packeting portion 26 is reset, stops outputting the predetermined sync code to the transmission stream 27 and inserts the dummy signal in place of the true sync code. At this time, the occurrence of the error data in the stream 14 resulting from discontinuity of the sync signal 12 delays by the time corresponding to the processing time of the compression processing portion 13.

Therefore, when the sync code of the stream 27 is stopped at the detection point of the discontinuous state, the sync code can be stopped at the normal data portion a little before the error data occurs.

When the packet analysis portion 29 detects that the sync code does not exist in the packet it receives, the decoding process of the packet received is stopped. Therefore, the output signal 22 of the receiver 15 is frozen under the normal image state immediately before the stop of decoding as shown in FIG. 6.

The reset signal 25 remains the "LOW" level signal from the time t2 at which the sync signal resumes the normal state till the time t3 which corresponds to at least the time required for the compression portion 13 to compress the leading part of the normal signal.

Whether or not the sync signal 12 resumes the normal state can be judged, for example, when the sync signals 12 separated and outputted by the component conversion portion 10 are continuously outputted in the correct cycle for the period of several cycles. To detect the normal state of the sync signal 12, the cycle of several vertical sync signals are detected for a predetermined period, and when the correct cycle is detected between the adjacent vertical sync signals, the counter is incremented. The counter is reset when the correct cycle is not detected. Whether or not the cycle is under the normal state can be judged as the comparator compares whether or not the count value reaches a predetermined number of times. Therefore, the period from the switching time t1 of the video signals to the time t2 at which the sync signal is judged as resuming the normal state (at which periodicity of the video signal is recovered) corresponds, in practice, to several vertical sync periods for the signal 6. In FIG. 6, however, the period from t1 to t2 of the signal 6 is shown corresponding substantially to one vertical period for simplifying illustration.

The period from the point t2, at which the sync signal returns to the normal state, to the point t3 at which the reset signal 25 is released is provided with a certain margin with respect to the time Tc2 that is necessary for the leading part to be compression-processed.

Therefore, resetting of the packeting portion 26 is released and the correct sync code is again added to the packet after the sync signal 12 returns to the complete normal state.

This ensures that the stream 14 returns to the complete normal data.

When the sync code is added to the stream 27, the packet analysis portion 29 detects this sync code and the decoder portion 16 is released from freezing. The normal monitor image is again outputted in the output signal 22 of the receiver 15. Incidentally, the processing time of the receiver 15 is zero in FIG. 6 for the sake of convenience of explanation.

It becomes thus possible to prevent the occurrence of distortion of the output images of the receiver even when the signals are changed over by the video switcher that does not have the frame synchronization function.

The present invention prevents the discontinuous point occurring in an input video signal of a transmitter from propagating to a receiver and inviting distortion of the image of the final output.

Preferred embodiments of the present invention detect the discontinuous point of input video signals by detecting the discontinuous point of a signal representing synchronization inside the transmitter, that is, distortion of periodicity, and stop immediately the generation of a periodical sync code as the output of a packeting portion. Here, the discontinuous point is detected in the prior stage of a compression portion, and it takes a certain processing time before the compression portion outputs error data resulting from the discontinuous data after the discontinuous data is inputted. For this reason, the error data does not occur in the output of the packeting portion at the point of time at which the discontinuous point is detected.

In other words, if the generation of the sync code is stopped from the detection point of the discontinuous point, a predetermined sync code is not imparted to some packets that precede the occurrence of the error data and the packet that contains at least the error data. The transmission side inserts a different dummy signal, which cannot be judged as the sync code at the reception side, in place of the sync code. For instance, the dummy signal may be the signal having one byte of all "0".

Consequently, when a packet analysis portion of the receiver detects whether or not the predetermined sync code exists in the received packet, the packet that may contain the error data can be detected before the error data is inputted to a decoder portion.

As a result, when the predetermined sync code is not detected, the normal image condition before distortion of the image can be maintained by executing an appropriate process of the output image on the reception side, such as a freezing process.

Another example of the image optimization process on the reception side may comprise storing in advance an initial screen or a black-only screen or a screen reading "wait for a while" in a memory (not shown), reading such a screen and outputting it to the monitor.

After the lapse of the recovery time at which a component conversion portion of the transmitter starts outputting a normal output, discontinuity detection portion releases resetting of the packeting portion. Speaking more strictly, the time from the point at which the discontinuous state of the sync signal gets stabilized to the time at which resetting is released is set to the time longer than the time required for the signal compression process of the discontinuous region in the compression portion.

At this point of the release of resetting, therefore, the normal data is inputted to the packeting portion. Since a predetermined sync code is added to the leading part of this packet, the packet analysis portion of the receiver can continuously output the normal decoded images by merely releasing the freeze to the decoder portion when it again detects the sync code added to the leading part of the packet.

As described above, the decoded images can be outputted smoothly without disturbing the images even at the time of switching of the video signals, without using the expensive video switcher equipped with a frame synchronization function.

Referring back again to FIG. 1, the release of resetting of the packeting portion 26 need not consider the processing time of the compression portion 13 when the compression portion 13, too, is reset by the reset signal 25 from the discontinuity detection portion 24.

Figure 7:
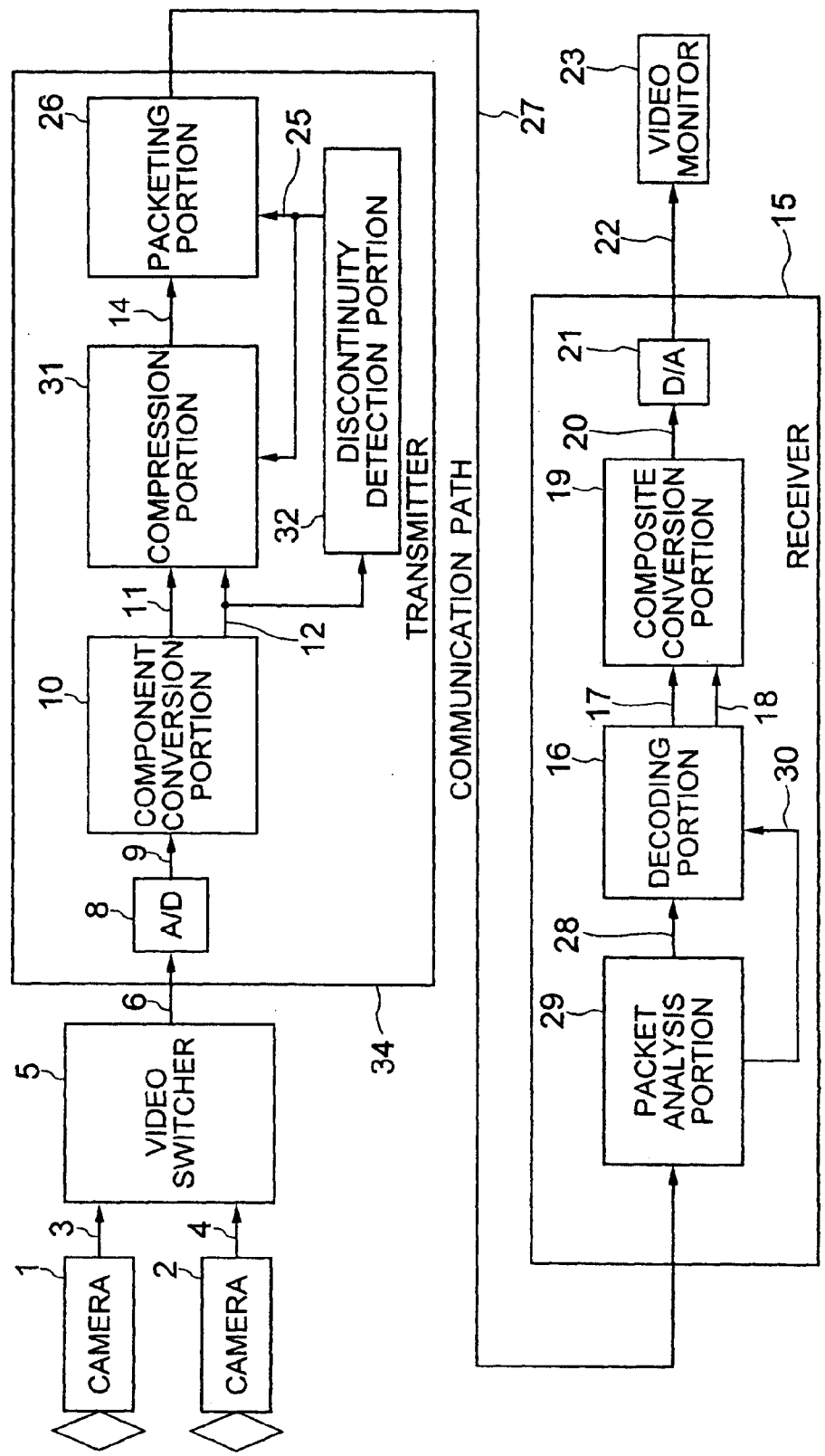
FIG. 7 is a block diagram showing the overall construction of a transmission system of video signals according to the second embodiment of the present invention.

FIG. 7 shows the construction of this second embodiment. The difference of this embodiment from the embodiment shown in FIG. 1 is that the reset signal 33 from the discontinuity detection portion 32 is given to the compression portion 31, too.

Figure 8:
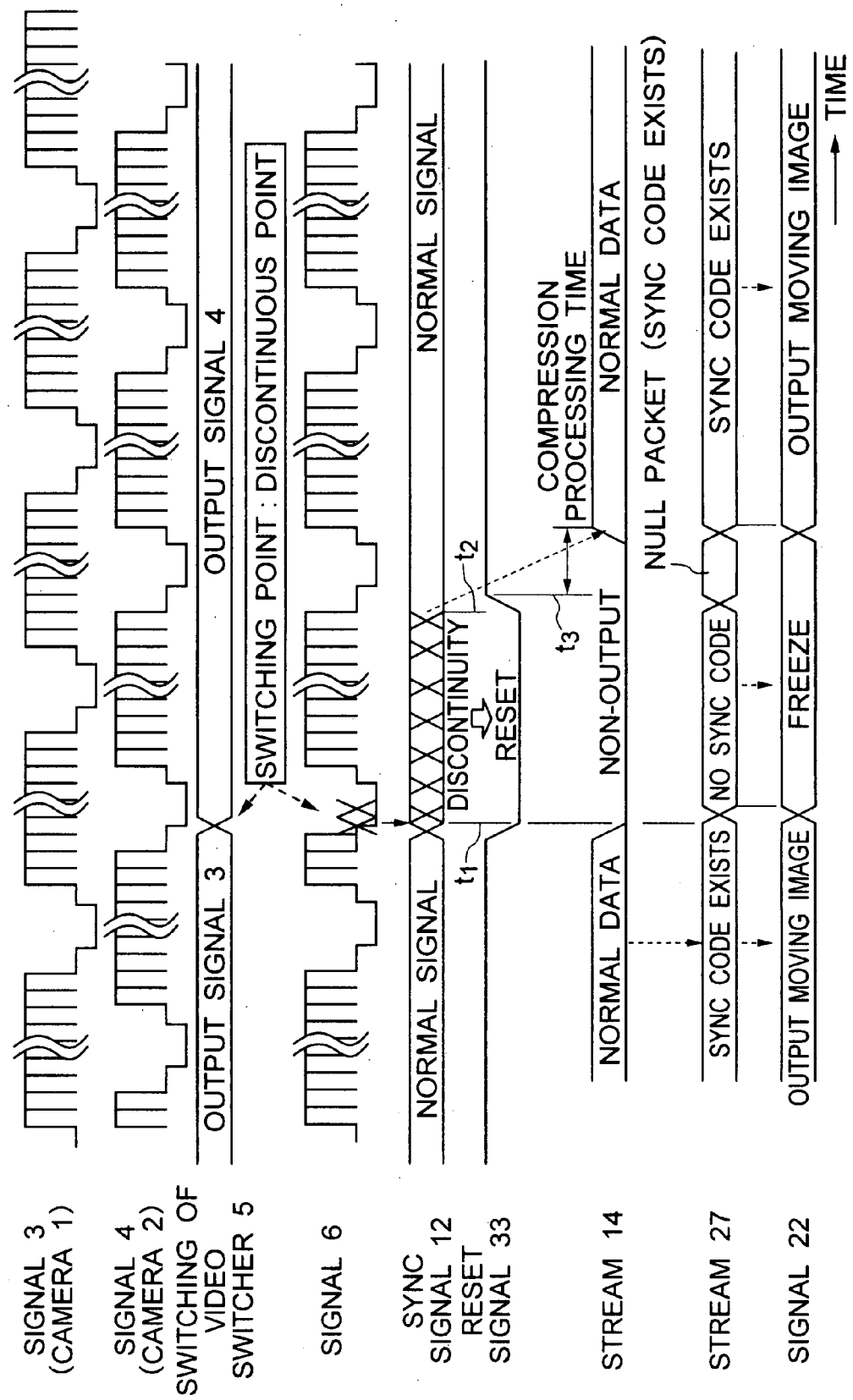
FIG. 8 is an explanatory signal diagram useful for explaining the operation of the transmission system shown in FIG. 7.

Next, the operation of the second embodiment will be explained with reference to FIG. 8. The compression portion 31, too, is reset simultaneously by the reset signal 33 from the discontinuity detection portion 32. In consequence, the stream 14 from the compression portion 31 enters the non-output state (reset state).

Resetting by the reset signal 33 is released when periodicity of the sync signal 12 is recovered. As resetting is released, the compression portion 31 starts processing. Since a certain time (about 33 msec) is necessary before the stream 14 as the compression-processing result is outputted. In the interim, the compression portion 31 quite naturally remains under the non-output state.

On the other hand, the packeting portion 26 starts again outputting the sync code from the release of resetting (time t3). Since the stream 14 is under the non-output state, however, the packeting portion 26 outputs a null packet.

This null packet is the one to which the sync code is included but the followed payload is meaningless data. The packet analysis portion 29 in the receiver 15 neglects automatically the null packet. Therefore, the operation of the receiver 15 is kept frozen continuously during the null packet period.

The subsequent operation can output the smooth image to the video monitor 23 in the same way as in the first embodiment. Incidentally, the processing time in the receiver 15 is shown as zero in FIG. 8 for the sake of convenience of explanation. The detection method of recovery of periodicity of the sync signal 12 is the same as that of the first embodiment.

The embodiment shown in FIG. 7 resets simultaneously the compression portion 31 besides the packeting portion 26. For this reason, even when the reset signal 33 is released immediately after recovery of periodicity of the sync signal 12, the error data does not exist in the stream 14 and does not either disturb the monitor image on the side of the receiver 15.

Figure 9:
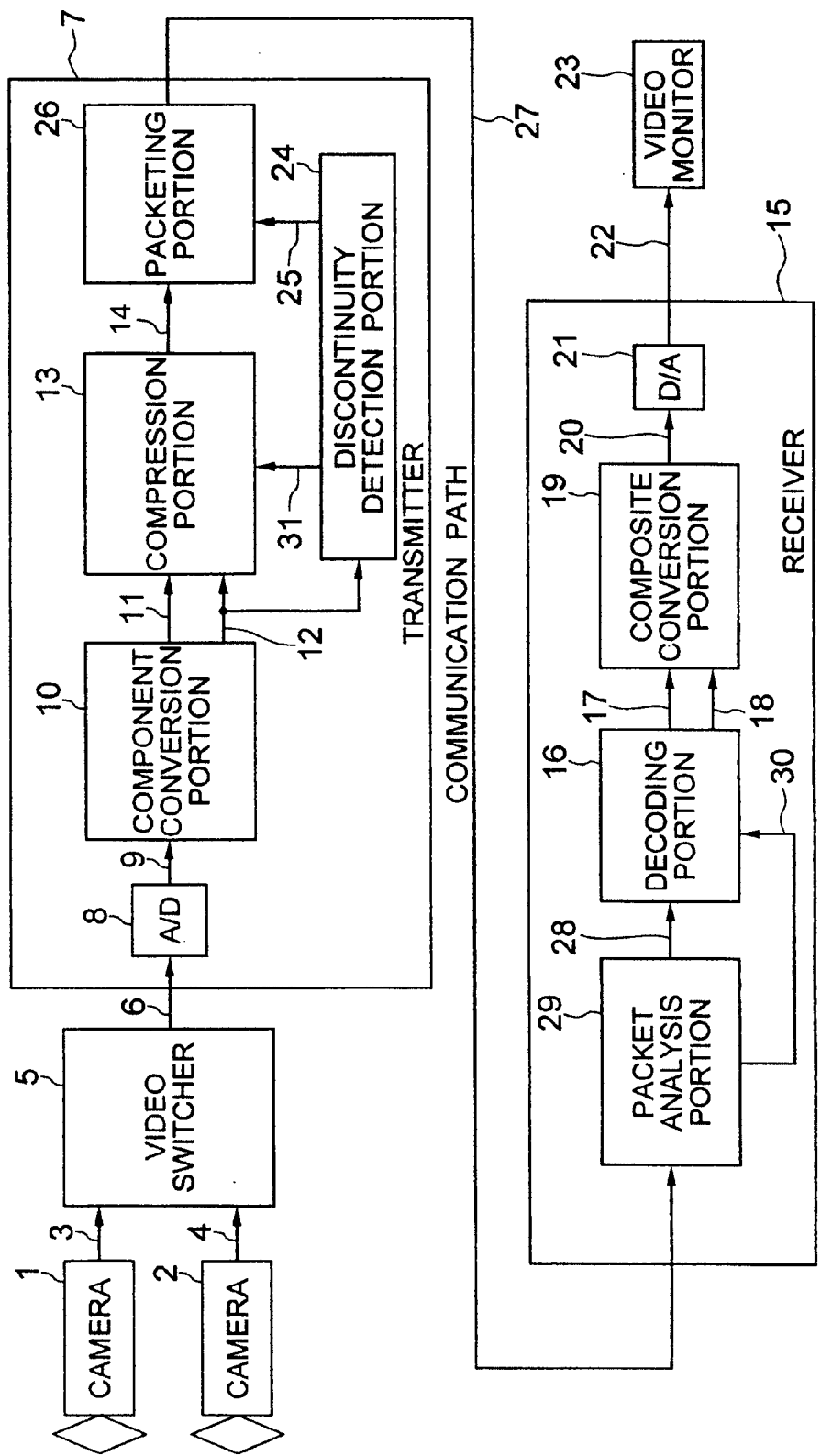
FIG. 9 is a block diagram showing the construction of a transmission system of video signals according to the third embodiment of the present invention.

Next, the video signal transmission system according to the third embodiment of the present invention will be explained with reference to the block diagram of FIG. 9 and the signal diagram of FIG. 10. In the second embodiment (FIG. 7) explained above, the reset signal from the discontinuity detection portion 24 is inputted simultaneously to the packeting portion 26 and to the compression portion 13, and resetting is released simultaneously. In this third embodiment, the release timing of the reset signal given to the packeting portion 26 and the release timing of the reset signal given to the compression portion 13 can be set independently of each other. More concretely, the reset release timing of the compression portion is belated than the reset release timing of the packeting portion. The difference of this reset releasing timing is the standby time. This standby time is decided in accordance with the sum of the time necessary for detecting a predetermined number of times the existence of the sync codes in the null packets received on the reception side, the time necessary for the initialization operation of the decoding processing on the reception side and the time necessary for indexing the leading part of the reference picture of the compression data. In the third embodiment, all of the detection method of the lack of periodicity (signal discontinuity) of the video signals and recovery of periodicity of the sync signal, and the operation on the reception side when the video signals lack periodicity, are basically the same as those of the first and second embodiments.

When discontinuity occurs in the signal 6 due to switching by the video switcher 5, disturbance of periodicity occurs in the sync signal 12. The discontinuity detection portion 24 detects this disturbance of periodicity of the sync signal 12 and indirectly detects discontinuity of the signal 6. The compression portion 13 and the packeting portion 26 are immediately reset by the reset signals 31 and 25. The output operation of the sync code of the stream 27 is stopped, and the non-sync code is added in place of the true sync code. The compression portion 13, too, is reset simultaneously, and the compressed data output is stopped, too.

The packet analysis portion 29 that inputs the stream 27 the sync code output of which is stopped detects the absence of the sync code having the cycle of 18 bytes (one packet length) and freezes the output of the decoder portion 16 by the sync code non-detection signal 30. The composite conversion portion 19 and the D/A converter 21 output the image thus frozen to the video monitor 23. In this way, freezing under the normal image stage can be made.

On the other hand, when the sync signal 12 gets stabilized at the time t2, the reset signal 25 for the packeting portion 26 is released at the time t2. The packeting portion 26 again outputs the packet to which the predetermined sync code is added, as the stream 27. Since the compression portion 13 is still reset at this point of time, the packet outputted at this time is the invalid packet, that is, the null packet, having a flag representing that the payload is invalid.

Detecting several times the sync code of the null packet in a predetermined interval, the packet analysis portion 29 of the receiver 15 reports the detection of the sync code to the decoder portion 16 as it inactivates the sync non-detection signal 30. Receiving this report, the decoder portion 16 executes the initialization process and enters the standby state until the data of the portion corresponding to the reference picture (I-picture of MPEG2) is outputted from the packet analysis portion 29. Quite naturally, the sync detection and the initialization process need a certain processing time, respectively.

The time necessary for detecting several times the sync code and for initializing the decoder portion is the period represented by T1 in FIG. 10. During this period T1, several video fields occur in the video signal 6, but the signal diagram of FIG. 9 shows them in a simplified form. The period T2 continuing the period T1 is the standby time for the I-picture as the first reference signal of the MPEG2 compression process.

The discontinuity detection portion 24 of the transmitter 7 releases resetting of the compression portion 13 at the time t3 within the period T2. This is the period during which the decoder portion 16 of the receiver 15 waits for the data corresponding to the reference picture, so that this data can be outputted from the packet analysis portion 29 and can be inputted to the decoder portion 16.

In other words, the data corresponding to the reference picture is normally the first data after the release of resetting of the compression portion 13. Therefore, the time from the release of resetting of the packeting portion 26 of the transmitter 7 to the release of resetting of the compression portion 13 is decided by taking the time required for detecting the sync code in the packet analysis portion 29 of the receiver 15 and the initialization process time of the decoder portion 16 into consideration. In this way, the return time from the freezing point of the decoder portion 16 to the normal reproduction output can be minimized when the input video signal changes from a discontinuity state to a normal state.

As described above, the decoder portion 16 is released from freezing and the process changes to the normal decoding process. The signals are outputted to the video monitor 23.

The flow of the signals described above will be explained once again with reference to FIG. 10. The signals 3 and 4 are dephased from each other due to asynchronization. When the video switcher 5 changes over the signal 3 to the signal 4, discontinuity develops in the signal 6 at the switching point, inviting discontinuity in the sync signal 12 for dozens of milliseconds. The discontinuity detection portion 24 detects discontinuity of this sync signal 12, resets the compression portion 13 and the packeting portion 26 by the reset signals 31 and 25 and stops outputting the sync code. In consequence, the output can be stopped at the normal data portion at the point at which the sync code of the stream 27 is stopped.

The output signal 22 of the receiver 15 is frozen under the normal image state shown in FIG. 10 because the packet analysis portion 29 detects the stop of the sync code and freezes the output signal.

On the other hand, the reset signal 25 is reversed to release resetting of the packeting portion 26 after the sync signal returns to the normal state, and the null packet with the sync code is outputted, to the stream 27. Next, the reset signal 31 releases resetting of the compression portion 13 after the lapse of a predetermined time (t3–t2). Consequently, the valid packet is outputted to the stream 27 after the invalid packet (null packet) lasting for a predetermined period. This invalid packet period is controlled so that it is substantially equal to the sum of the sync detection time by the packet analysis portion of the receiver 15 and the initialization process time of the decoder portion 16. Therefore, the decoder portion 16 can set the standby time of the data corresponding to the reference picture to almost zero and can return from the frozen state.

When the receiver cannot detect the sync code in each of the foregoing embodiments, the decoding data is frozen so that the images can be automatically frozen under the normal image stage before image distortion. However, the present invention is not particularly limited thereto. For example, the image may be switched to the blue-back or another image prepared beforehand in place of the frozen image.

The transmission system and the control method of the transmission system according to the present invention is not particularly limited to the transmission only of the video signals but can be applied to the case where the speech signals and the data signals are transmitted together with the video signals. The transmission line used in the transmission system according to the present invention may be an Internet or a dedicated wired channel or a wireless communication channel.

As described above, the present invention can provide the practical transmission apparatus that stops adding the predetermined sync code to the packeted transmission stream when discontinuity of the input video signals is detected inside the transmitter that switches a plurality of video signals and codes and transmits them. The transmission apparatus executes further an appropriate process of the output images, such as freezing, when its receiver cannot detect the sync code. Therefore, the transmission apparatus of the present invention is free from the problem of distortion of the output images even though it does not use the expensive video switcher equipped with the frame synchronization function.

When the discontinuous state returns to the normal state, the predetermined sync code is again added to the packet of the transmission stream. Therefore, the receiver can automatically shift from the frozen state to the normal moving image output state.

Transmission apparatuses in general are those systems which execute the packet process and transfer the packets. Therefore, the present invention does not a large modification of the existing system.

In addition, the discontinuous state is transmitted to the receiver by means of the state of the sync code of each packet. Therefore, this transmission can be accomplished easily without adding new information (such as discontinuity occurrence information) to the transmission line.

When discontinuity is solved and the stable state is resumed, the time from the release of resetting of the packeting portion of the transmitter to the release of resetting of the compression portion is controlled in consideration of the time required for detecting the sync code in the packet analysis portion of the receiver and the initialization time of the decoder portion. Therefore, the return time of the decoder portion from the freeze state to the normal reproduction output can be minimized at the point when the input video signal changes from the discontinuous state to the normal state.

What is claimed is:

1. A method of controlling a system for transmitting data-compressed coded digital video signals in a packet form from a transmission portion to a reception portion through a signal line, comprising the steps of:

in said transmission portion:
switching selectively any one of a plurality of video signals having mutually asynchronous phases,
converting the selected video signal to a data-compressed coded digital video signal,
converting said data-compressed coded digital video signals to a signal stream as a sequence of a plurality of packets each containing a predetermined sync code and a payload, and transmitting said signal stream from said transmission portion, and when a failure of periodicity of the digital video signal is detected prior to the step of converting said digital video signal to the data-compressed coded digital video signal, transmitting a signal stream containing a packet having a dummy signal, that is not said sync code, inserted into a position of said sync code in a packet to be transmitted at that time, when a failure of periodicity of said video signals is detected; and in said reception portion,
when said reception portion does not detect said predetermined sync code in a predetermined period from the signal stream received from said transmission portion, stopping image reproduction process on the packet containing said dummy signal inserted in a position of said sync code in the received signal stream, and
executing an image reproduction process based on a predetermined normal video signal data not depending on said packet containing said dummy signal received in said reception portion.

2. A method of controlling a transmission system according to claim 1, further comprising the steps of:
switching selectively any one of a plurality of video signals having mutually asynchronous phases, and outputting said video signal to said transmission portion; and
converting said video signal so outputted to a coded digital signal.

3. A method of controlling a transmission system according to claim 1, wherein said step of executing said image reproduction process outputs a video signal obtained by decoding a stream of a normal packet at the time of detection of said sync code.

4. A method of controlling a transmission system according to claim 1, wherein said step of executing said image reproduction process outputs the normal video signal of a predetermined image previously stored in a memory, when said predetermined sync code cannot be detected at a predetermined position in the packet received.

5. A method of controlling a transmission system according to claim 1, further comprising the step of:
In said transmission portion:
resetting said data compression process and outputs the signal stream including a null packet when the failure of periodicity of said video signals is detected.

6. A method of controlling a transmission system according to claim 1, further comprising the step of:
resetting said image reproduction process of said signal stream received when said predetermined sync code is not detected from said signal stream received in said reception portion.

7. A method of controlling a transmission system according to claim 1, further comprising the step of:
In said transmission portion:
when a failure of periodicity of the digital video signal is detected in said digital video signal prior to the step of converting said digital video signal to the data-compressed coded digital video signal, starting inserting again said predetermined sync code into said packet, and setting arbitrarily a standby time from re-start of insertion of said predetermined sync code to release of resetting of data compression process.

8. A method of controlling a transmission system according to claim 7, wherein said standby time in said transmission portion is decided based on a sum of time necessary for detecting a predetermined number of times existence of said predetermined sync code in a null packet which includes null data as a payload received by said reception portion, a time necessary for an initialization operation of said image reproduction process on said reception portion, and a time necessary for indexing the leading part of a reference picture of compressed data.

9. A method of controlling a transmission apparatus for transmitting coded digital video signals in a packet form from a transmission portion to a reception portion, comprising the steps of:
   in said transmission portion:
   switching selectively any one of a plurality of video signals having mutually asynchronous phases,
   converting the selected video signal to a data-compressed coded digital video signal,
   converting said data-compressed coded digital video signals to a signal stream of a sequence of a plurality of packets each containing a predetermined sync code and a payload, and transmitting said signal stream, and
   when a failure of periodicity of the digital video signal is detected prior to the step of converting said digital video signal to the data-compressed coded digital video signal, transmitting a signal stream containing a packet having a dummy signal, that is not said sync code, inserted into a position of said sync code in a packet to be transmitted at that time; and
   in said reception portion:
   when said reception portion does not detect said predetermined sync code in a predetermined period from the signal stream received from said transmission portion, stopping image reproduction process on the packet containing said dummy signal inserted in the position of said sync code in the received signal stream, and
   executing an image reproduction process based on a predetermined normal video signal data not depending on said packet containing said dummy signal,
   wherein packets of said signal streams are formed by a packeting portion included in said transmission portion and the packets of said signal stream are analyzed by a packet analyzing portion included in said reception portion, and
   wherein the packet analyzing portion detects whether said predetermined sync code is included in each packet.

10. A method of controlling a transmission apparatus according to claim 9, wherein said step of stopping and executing said image reproduction process outputs the video signal obtained by decoding a normal packet at the time when said predetermined sync code is detected, in case said predetermined sync code cannot be detected at a predetermined position in a packet received.

11. A method of controlling a transmission apparatus according to claim 9, wherein said step of stopping and executing said image reproduction process outputs a video signal of a predetermined image in case said predetermined sync code cannot be detected at a predetermined position in a packet received.

12. A system for transmitting coded digital video signals in a packet form from a transmission portion to a reception portion through a signal line, wherein:
   in said transmission portion:
   switching selectively any one of a plurality of video signals having mutually asynchronous phases,
   said transmission portion includes a switch for switching selectively any one of a plurality of video signals having mutually asynchronous phases, an encoder for converting the selected video signal to a data-compressed coded digital video signal and converting said data-compressed coded digital video signals to a signal stream as a sequence of a plurality of packets each containing a predetermined sync code and a payload, and outputting a signal stream from said transmission portion, and means, when a failure of periodicity of the digital video signal is detected prior to converting said digital video signal to the data-compressed coded digital video signal, for transmitting a signal stream containing a packet having a dummy signal, that is not said sync code, inserted into a position of said sync code in a packet to be transmitted at that time; and
   said reception portion includes a decoder for executing an image reproduction process, wherein when said reception portion does not detect said predetermined sync code in a predetermined period from the signal stream received from said transmission portion, stopping image reproduction process on the packet containing said dummy signal inserted in a position of said sync code in the received signal stream and executing an image reproduction process based on a predetermined normal video signal data not depending on said packet containing said dummy signal.

13. A system for transmitting coded digital video signals according to claim 12, further comprising:
   an input switcher for inputting a plurality of video signals having mutually asynchronous phases, switching selectively any one of the plurality of video signals and inputting a selected video signal to said transmission portion,
   wherein said encoder includes means for converting video signals outputted from said switcher to coded digital signals.

14. A system for transmitting coded digital video signals according to claim 12, which further comprising:
   judgment means for detecting a sync signal contained in said video signals, judging that periodicity of said video signals is lost when said sync signal so detected does not satisfy a predetermined condition, and outputting a signal for causing said encoder to stop adding said predetermined sync code to said packet.

* * * * *